July 31, 1945. R. M. HALL 2,380,907
PISTON FOR INTERNAL-COMBUSTION ENGINES
Filed Feb. 15, 1944 2 Sheets-Sheet 1
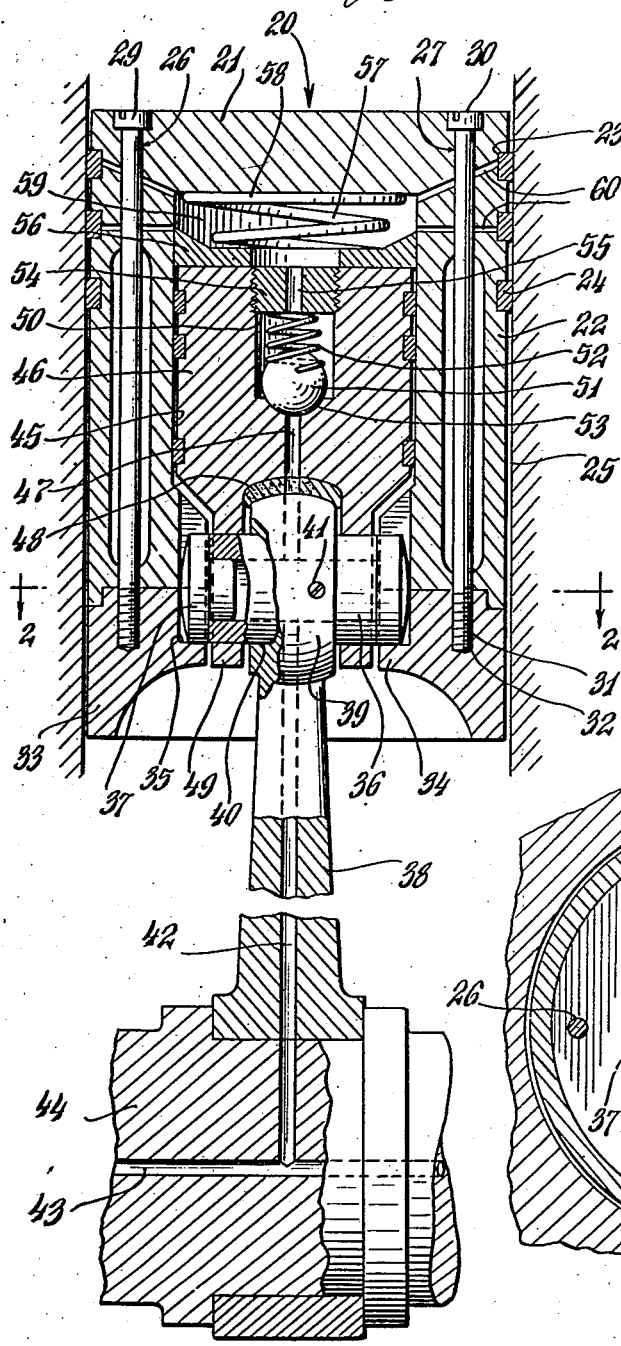
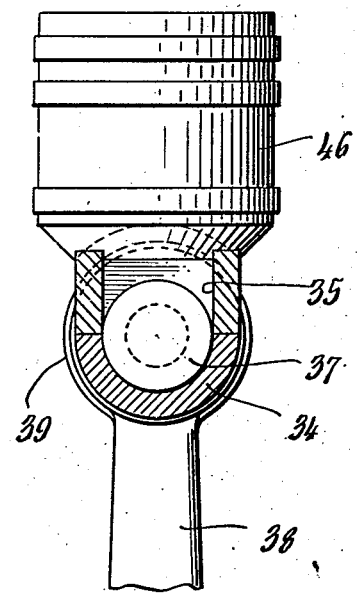
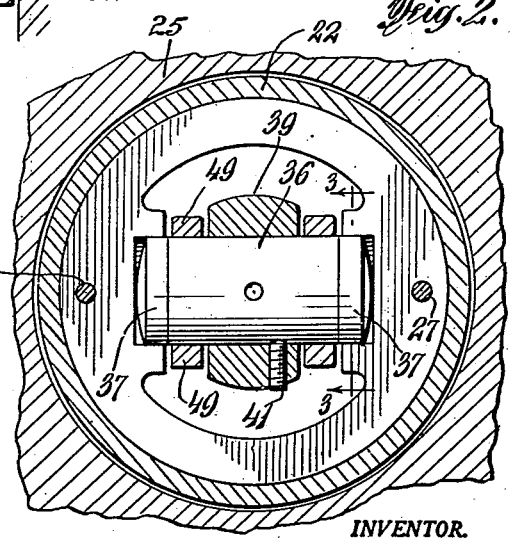
INVENTOR.
Roy M. Hall
BY
ATTORNEY July 31, 1945. R. M. HALL 2,380,907
PISTON FOR INTERNAL-COMBUSTION ENGINES
Filed Feb. 15, 1944 2 Sheets-Sheet 2
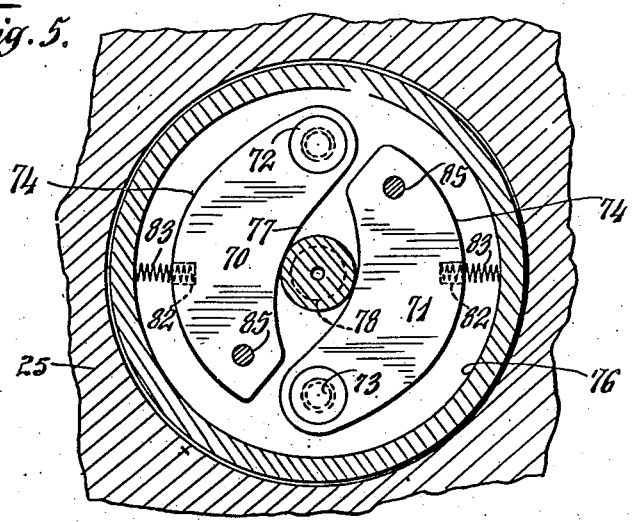
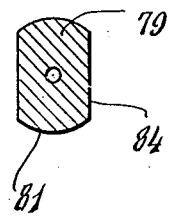
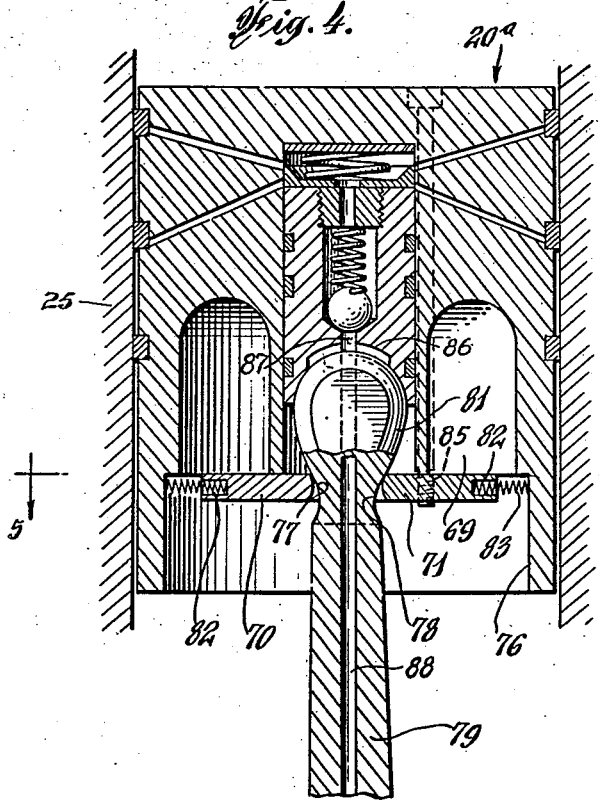
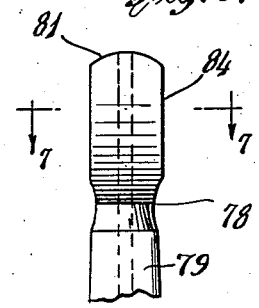
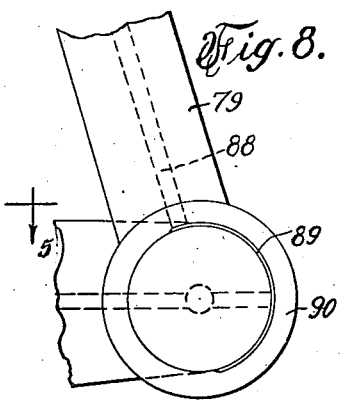
INVENTOR.
Roy M. Hall
BY
ATTORNEY Patented July 31, 1945

2,380,907

UNITED STATES PATENT OFFICE 2,380,907

PISTON FOR INTERNAL-COMBUSTION ENGINES

Roy M. Hall, Laredo, Tex., assignor of one-half to Stanley Konaszewski, Brooklyn, N. Y.

Application February 15, 1944, Serial No. 522,445

17 Claims. (Cl. 309—6)

This invention relates to pistons for internal combustion engines.

One object of the invention is to provide in an internal combustion engine a piston assembly readily removable from the cylinder.

Another object of the invention is to provide a means hydraulically for cushioning the forces of the combustion.

Another object of the invention is to provide a simple, economical and durable piston for internal combustion engines.

Another object of the invention is to provide lubrication for pistons without requiring constant agitation of the lubricating oil supply.

The above and other objects of the invention may be obtained by providing registering oil passages in the crank shaft and connecting rod through which oil may be forced under pressure out of the end of the connecting rod and past a ball check valve in a small hydraulic piston to be trapped. Upon combustion, the oil takes the shock of the explosion and escapes through small drilled passages in a main piston and through the upper piston ring grooves to the cylinder wall.

In one form of the invention cap screws in the main piston maintain locking arms or brackets in engagement with a reduced neck portion of the connecting rod. By removing the cap screws, the locking arms or brackets may release the connecting rod to permit withdrawal of the piston therefrom.

In another form of the invention the connecting rod and a main piston are connected by a wrist pin having sliding movement in recessed bosses within the main piston to accord with the relative movement of the attached auxiliary piston in the main piston.

The invention will be more clearly understood by referring to the following detailed description and accompanying drawings forming a part thereof wherein—

Fig. 1 is a sectional view of a piston and associated parts embodying one form of the invention.

Fig. 2 is a sectional view taken on the plane of the line 2—2 of Fig. 1.

Fig. 3 is an elevational view of the auxiliary piston and its connection with the connecting rod, parts being shown in section.

Fig. 4 is a sectional view of a piston and associated parts embodying another form of my invention.

Fig. 5 is a sectional view taken on the plane of the line 5—5 of Fig. 4.

Fig. 6 is a detail view showing the upper end of the connecting rod shown in Fig. 4.

Fig. 7 is a sectional view taken on the plane of the line 7—7 of Fig. 6.

Fig. 8 is a diagrammatic view on a reduced scale showing the communicating passages in the connecting rod and its lower bearing.

Referring to the drawings wherein similar parts are indicated by identical reference numerals and particularly with reference to the form shown in Fig. 1, an engine piston 20 having a head 21 and skirt 22 is formed with ring grooves 23 and piston rings 24 for sealing action in cylinder wall 25. The main engine piston is provided with opposed longitudinal openings 26 and 27 for the reception of cap screws 29 and 30, each having threaded extremities 31 for locking engagement in screw threaded recesses 32 in a separate base portion 33. This base portion is provided with opposite bosses 34 having rounded recesses 35 for receiving a wrist pin 36, said wrist pin having terminal aluminum plugs 37 for engagement in the recesses 35. Connecting rod 38 has an enlarged end 39 provided with recess 40 for receiving wrist pin 36 and a locking screw 41 therein serves to retain the elements in connection.

A longitudinal passage 42 in the connecting rod registers with an oil passage 43 in crank shaft 44. Engine piston 20 has an axial aperture 45 in which is slidingly retained an auxiliary or hydraulic piston 46, the latter having an axial bore 47 serving as an oil passage and communicating with the connecting rod and crank shaft oil passages 42 and 43, respectively. Packing disc 48 over the connecting rod has an opening in alignment with the oil passages. Spaced depending ears 49 of the hydraulic piston 46 engage the wrist pin on opposite sides of the connecting rod.

Auxiliary piston 46 is provided with an axial chamber 50 communicating with its oil passage 47 and containing a check ball 51 lightly held by spring 52 to seat on circular seat 53 to seal the oil passage 47 save against pressure sufficient to overcome spring 52. Opposite seat 53, dome plug 54 is screwed in chamber 50. The dome plug has a central passage 55 for permitting oil flow, and is surmounted by perforated packing 56 carrying a stiff spring 57 which seats against spacing washer 58 at the top of oil chamber 59. Communicating with the latter are a series of radial oil passages 60, preferably four or more in number, whereby the oil may escape to the cylinder walls after cushioning the explosion.

From the foregoing it will be observed that on the downward travel of the engine piston 20 on an engine with vertical cylinders, the pressure of oil through communicating passages 43, 42 and 47 causes the oil to move past ball check valve 51. On the return stroke the oil is prevented from withdrawing by seating of ball check valve 51 under spring 52 on circular seat 53. Successive downward movements of the engine piston causes the oil to be forced upwardly through plug passage 55 and perforated packing 56 to maintain a constant supply of oil in chamber 59, whence the oil is expelled to the circular walls via radial oil passages 60.

The hydraulic feature thus permits the cushioning of the forces of combustion on the piston proper, and the oil forced out upon the hot engine cylinder wall provides sufficient and economical lubrication without necessitating splashing of the oil in the engine crank case, consequently. The oil may be carried in a separate tank, if desired, as is the current practice in aircraft dry sump engines. By utilizing the hydraulic feature to cushion the forces of combustion and effect lubrication without constant agitation of the oil, the oil maintains its viscosity longer and lower oil consumption, higher compression ratios, and advantageous use of lower grade fuels are made practicable.

The piston construction described above is additionally advantageous in enabling ready accessibility. The piston assembly may be removed by removing cap screws 29 and 30, whereupon the piston may be conveniently withdrawn from the engine. This ready accessibility permits the replacement of piston rings without disturbing the connecting rods and in a fraction of the time required at present. By removal of the two cap screws 29 and 30, the main portion of the engine piston 20, on the type using a wrist pin, may be separated from its base 33. When enough screw clearance has been obtained, the base 33 may be pushed down and given a half turn and then pulled up and out of the cylinder, thereby relieving the hydraulic piston 46 attached to the end of the connecting rod. Thereafter, auxiliary piston 46 may be removed by loosening set screw 41 and by pushing wrist pin 36 to one side of the cylinder bore. The wrist pin 36 may be further shortened by removal of aluminum end caps 37.

It will be apparent that the wrist pin 36 is somewhat different from the conventional wrist pin in that it is relatively short and is not connected to the engine piston but only to the auxiliary piston 46. As there will be a limited movement of the auxiliary piston within the engine piston, the design permits the wrist pin to move up and down within the bosses 34.

As the connecting rod moves down as on the intake stroke (of a vertical type engine), the connecting rod being connected to the auxiliary piston pulls it downwardly within the bore of the main piston until the engagement of the wrist pin with the seats in the bosses 34. This engagement then forces the main piston to move downwardly with the auxiliary piston.

On the upward or compression stroke, the connecting rod moves the auxiliary piston upwardly within the bore of the main piston and moves the main piston when the resistance of the spring and the pressure of the oil in the chamber 59 has been overcome.

As the engine fires, the main piston compresses the spring 57 and the oil within the chamber 59 and thrusts the auxiliary piston downwardly forcing the wrist pin back onto its seats and through the wrist pin applies pressure to the connecting rod.

On the exhaust stroke, the connecting rod moves the wrist pin and the auxiliary piston upwardly again and thus compresses the spring and oil in the chamber 59 so as to force the main piston upwardly and thus exhaust the gases above the main piston.

The relative positions of the connecting rod and crank shaft is such that when the piston is on the down stroke or intake stroke when the connecting rod has pulled the small or auxiliary piston down in the main engine piston to the limit allowed, the oil holes in the crank shaft and connecting rod crankshaft bearing are to register or be timed so that oil under pressure will pass from the crankshaft through the drilled passage in the connecting rod out its upper end and overcome spring tension of the ball check valve and fill the oil chamber 59 provided above the auxiliary piston. On the up stroke or the compression stroke of a four-cycle or four-stroke engine, a small amount of the trapped oil will be forced out through the small drilled passages and discharged adjacent to the upper piston rings and cylinder wall. It is intended that this will be only a very small part of the trapped oil, the rest of the oil acting as a cushioning agent when the engine fires on the next or third stroke of a four-cycle engine and drives the piston down or away from the head of the cylinder, during which stroke oil will be discharged adjacent the piston rings. It is not intended that all the trapped oil will be used up even on the firing stroke and this can be controlled by properly proportioning the discharge passages. However should the oil chamber above the auxiliary piston become dry the coil spring 57 will provide sufficient cushioning until oil again reaches this chamber. The arrangement of the parts is such that when one piston moves toward the other oil in the chamber 59 is discharged through the passages 60 to points adjacent the piston rings 23 and when one piston moves away from the other oil is drawn into the chamber.

In the modified form of the invention shown in Fig. 4, the wrist pin connection is dispensed with. A unitary engine piston 20a is provided with a lower recess 69 in lieu of bosses 34. At opposite sides of recess 69, lock arms or brackets 70 and 71 are provided on pivots 72 and 73, respectively. Each lock arm has an edge 74 spaced from skirt 76 of the piston and a curved inner edge 77 for engaging reduced neck portion 78 of connecting rod 79. It will be noted that connecting rod 79 is specifically different from connecting rod 38 in that it is characterized by a pear-shaped, flat-sided end 81. The flat-sided rod end prevents the spinning of the piston as might otherwise result from the swirling action of the incoming gases.

Lock arms 70 and 71 have holes 82 in the edges 74 to receive light springs 83 for positioning the lock arms in alignment with the cap screws and to engage the neck 78 of the connecting rod immediately under flattened sides 84 thereof.

A passage 86 formed on the under surface of the auxiliary piston continuously connects its central passage 87 with the upper end of the central passage 88 of the connecting rod, and a similar passage 89 formed around the periphery of the lower bearing 90 of the connecting rod for substantially one-half the distance thereof continuously connects the lower end of the central passage 88 with the oil supply under all conditions of the connecting rod.

The general operation of the modified form is identical with the operation of the form first described above in that the hydraulic effect caused by the pumping of the oil through the connecting rod and its entrapment above the auxiliary piston causes cushioning of the explosive shock and expulsion through the reduced radial oil passages to the periphery of the engine piston. When it is desired to remove the piston from the engine, the cap screws may be removed, thereby enabling the lock arms 70 and 71 to be withdrawn past the enlarged head of the connecting rod. Upon reinstallation, the springs 83 assist in positioning the lock arms 70 and 71 to permit engagement of the cap screws in threaded recesses 85 in the lock arms.

It will be understood that the constructions described hereinabove are desirable embodiments of the invention such as have been found efficient and sound from the standpoint of design. However, it should be understood that the invention is not to be limited by the construction details disclosed herein but only by the scope of the appended claims.

I claim:

1. A piston construction for an internal combustion engine comprising a main piston having a recess, an auxiliary piston movable within said recess, a connecting rod having a pear-shaped, flat-sided end portion and means engaging the connecting rod at the sides of said end portion for attaching the auxiliary piston to the connecting rod.

2. A piston construction for an internal combustion engine comprising a main piston having a recess, an auxiliary piston movable within said recess, a base for the main piston, a connecting rod having a wrist pin connection with the auxiliary piston and means on the base for retaining the wrist pin for limited travel.

3. A piston construction for an internal combustion engine comprising a main piston having a recess, an auxiliary piston movable within said recess and defining thereabove and in the recess an oil distributing chamber, a relatively small radial oil passage in the engine piston extending between the oil distributing chamber and the periphery of the engine piston, a connecting rod pivotally attached to the auxiliary piston, a crank shaft actuated by said connecting rod, means for supplying oil to said crank shaft, and means within said elements for forcing oil from said crank shaft to the periphery of the main piston.

4. A piston construction for an internal combustion engine comprising a main piston having a recess, an auxiliary piston slidable within said recess and defining thereabove and in the recess an oil distributing chamber, a relatively small radial oil passage in the main piston extending between the oil distribution chamber and the periphery of the main piston, a connecting rod pivotally attached to the auxiliary piston, a crank shaft actuated by said connecting rod, means for supplying oil to said crank shaft, and means within said elements for forcing oil from said crank shaft to the periphery of the main piston.

5. A piston construction for an internal combustion engine comprising a main piston having a recess, an auxiliary piston movable within said recess, a connecting rod and a cap screw extending through the main piston for attaching the auxiliary piston to the connecting rod.

6. A piston construction for an internal combustion engine comprising a main piston having a recess, an hydraulic piston movable within said recess, a connecting rod, opposed locking elements for attaching the hydraulic piston to the connecting rod and spaced cap screws extending through the main piston for assembling the locking elements on the connecting rod.

7. The combination of a piston and a connecting rod therefor, said piston having a body portion with a central recess, and said connecting rod having an enlarged head portion and displaceable means fastened to said body portion for releasably securing said rod to the body portion.

8. The combination of a piston having a body portion with a central recess and a connecting rod having an enlarged head, of means detachably fastened to the body portion for releasably securing the rod to the piston body.

9. The combination of a piston having a body portion with a central recess and a connecting rod having an enlarged head, of a pair of oppositely disposed arms pivotally secured to said body portion and adapted to engage the enlarged head of said rod for securing said rod to the body and means for detachably holding said arms in rod engaging position.

10. A piston construction for an internal combustion engine including a main piston having a recess, an auxiliary piston in said recess and movable axially thereof, said pistons being so arranged as to leave a chamber therebetween, and means for supplying fluid to said chamber, said main piston being formed with passages leading from said chamber to the exterior of the main piston to permit said fluid to flow to the exterior of the main piston under pressure.

11. A piston construction for an internal combustion engine including a main piston having a central recess, an auxiliary piston in said recess and movable axially thereof, said pistons being so arranged as to leave a chamber above said auxiliary, means for supplying fluid to said chamber and a spiral spring in said chamber between said pistons, said main piston being formed with passages leading from said chamber to the exterior of the main piston to permit said fluid to flow to the exterior of the main piston under pressure for cushioning the movement of said auxiliary piston and for lubricating the exterior wall of the main piston.

12. A piston construction for an internal combustion engine comprising a main piston having a base portion and a recess, an auxiliary piston movable within said recess, spaced ears on said auxiliary piston extending through said base, a wrist pin supported across said ears and protruding on both sides thereof, a connecting rod fastened to said pin between said ears and bosses on opposite sides of said base for supporting the protruding ends of said pin and for limiting the movement of said auxiliary piston.

13. In a piston construction for an internal combustion engine, a connecting rod having an elongated shank portion, a pear-shaped head with opposite flat sides and a reduced neck portion between the shank and head.

14. In a piston construction for an internal combustion engine, a wrist pin having a cylindrical body portion with a recess in each end extending axially of the body and an aluminum cap detachably mounted in each recess and forming an extension of said body.

15. A piston construction for internal combustion engines comprising a main piston consisting of an upper part and a lower part and having a chamber between them containing an auxiliary piston movable relative to said main piston, means accessible from the upper part of the main piston for clamping the two parts together, the lower part of the main piston having spaced bosses with clearance spaces between the bosses, a wrist pin connected to the auxiliary piston and normally guided in said bosses, the lower part of the main piston being removable after the upper part thereof has been detached by disengaging the lower part from the wrist pin and rotating it so that the clearance spaces are brought into alignment with the ends of the wrist pin whereby both parts of the main piston may be removed through the upper end of the coacting cylinder of the engine.

16. A piston construction for internal combustion engines comprising a piston consisting of an upper part and a separate lower part having bosses with clearance spaces between them, a connecting rod, a wrist pin carried by said rod and adapted to seat in said bosses, means accessible from the upper part for detachably connecting said upper and lower parts together, the lower part being removable after the upper part has been detached by disengaging the lower part from the wrist pin and rotating it so that the clearance spaces are brought into alignment with the ends of the wrist pin whereby both the upper and lower parts may be removed through the upper end of the coacting cylinder of the engine.

17. A piston construction for an internal combustion engine comprising a main piston having a recess and having spaced grooves in its periphery, piston rings in said grooves, an auxiliary piston movable within said recess and defining thereabove and in the recess an oil distributing chamber, relatively small radial oil passages in the engine piston extending between the oil distributing chamber and the periphery of the engine piston adjacent the piston rings, a connecting rod pivotally attached to the auxiliary piston, a crank shaft actuated by said connecting rod, means for supplying oil to said crank shaft and means within said elements for forcing oil from said crank shaft to the periphery of the main piston.

ROY M. HALL.